United States Patent
Kim et al.

(10) Patent No.: US 7,415,246 B2
(45) Date of Patent: Aug. 19, 2008

(54) ATTENUATION OF HIGH-POWER INBOUND RF SIGNALS BASED ON ATTENUATION OF A T/R SWITCH

(75) Inventors: Hea Joung Kim, Los Angeles, CA (US); Brima B. Ibrahim, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 565 days.

(21) Appl. No.: 10/701,575

(22) Filed: Nov. 5, 2003

(65) Prior Publication Data

US 2005/0095993 A1 May 5, 2005

(51) Int. Cl.
*H04B 17/00* (2006.01)

(52) U.S. Cl. .................. 455/67.11; 455/67.14; 455/68; 455/522; 455/115.2

(58) Field of Classification Search .............. 455/67.11, 455/67.14, 68, 69, 70, 522, 115.2, 115.1, 455/226.1; 370/249
See application file for complete search history.

(56) References Cited

U.S. PATENT DOCUMENTS

| | | | | |
|---|---|---|---|---|
| 3,858,206 A | * | 12/1974 | Scheidler et al. | 342/83 |
| 5,146,614 A | * | 9/1992 | Furuno | 455/571 |
| 5,379,450 A | * | 1/1995 | Hirasawa et al. | 455/570 |
| 5,663,968 A | * | 9/1997 | Heuer | 714/745 |
| 5,963,855 A | | 10/1999 | Lussenhop et al. | |
| 6,018,644 A | * | 1/2000 | Minarik | 455/82 |
| 6,272,322 B1 | * | 8/2001 | Su | 455/67.14 |
| 6,272,327 B1 | | 8/2001 | Kurchuk et al. | |
| 6,418,304 B1 | * | 7/2002 | Morrar | 455/343.1 |
| 7,039,399 B2 | * | 5/2006 | Fischer | 455/422.1 |
| 2002/0012142 A1 | * | 1/2002 | Gautheron et al. | 359/124 |
| 2005/0095993 A1 | * | 5/2005 | Kim et al. | 455/78 |

\* cited by examiner

*Primary Examiner*—Matthew Anderson
*Assistant Examiner*—Minh Dao
(74) *Attorney, Agent, or Firm*—Garlick Harrison & Markison; Timothy W. Markison

(57) ABSTRACT

A method for determining attenuation of a transmit/receive switch for attenuating inbound RF signals begins by enabling the transmit/receive switch to provide a loop back configuration between a transmitter section and a receiver section of a radio frequency integrated circuit. When the transmit section provides a test RF signal to the receiver section the processing continues when the receiver section measures the signal strength of the test RF signal to produce a $1^{st}$ signal strength. The processing continues by enabling receive attenuation mode of the transmit/receive switch. The processing continues when the transmit section provides another test RF signal to the receiver section via the transmit/receive switch in the receive attenuation mode to produce an attenuated test RF signal. The processing continues when the receive section measures the signal strength of the attenuated test RF signal to produce a $2^{nd}$ signal strength. The processing continues when the $1^{st}$ signal strength is compared with the $2^{nd}$ signal strength to determine the attenuation of the transmit/receive switch.

24 Claims, 6 Drawing Sheets

RX input signal strength range

RX attenuation activation point

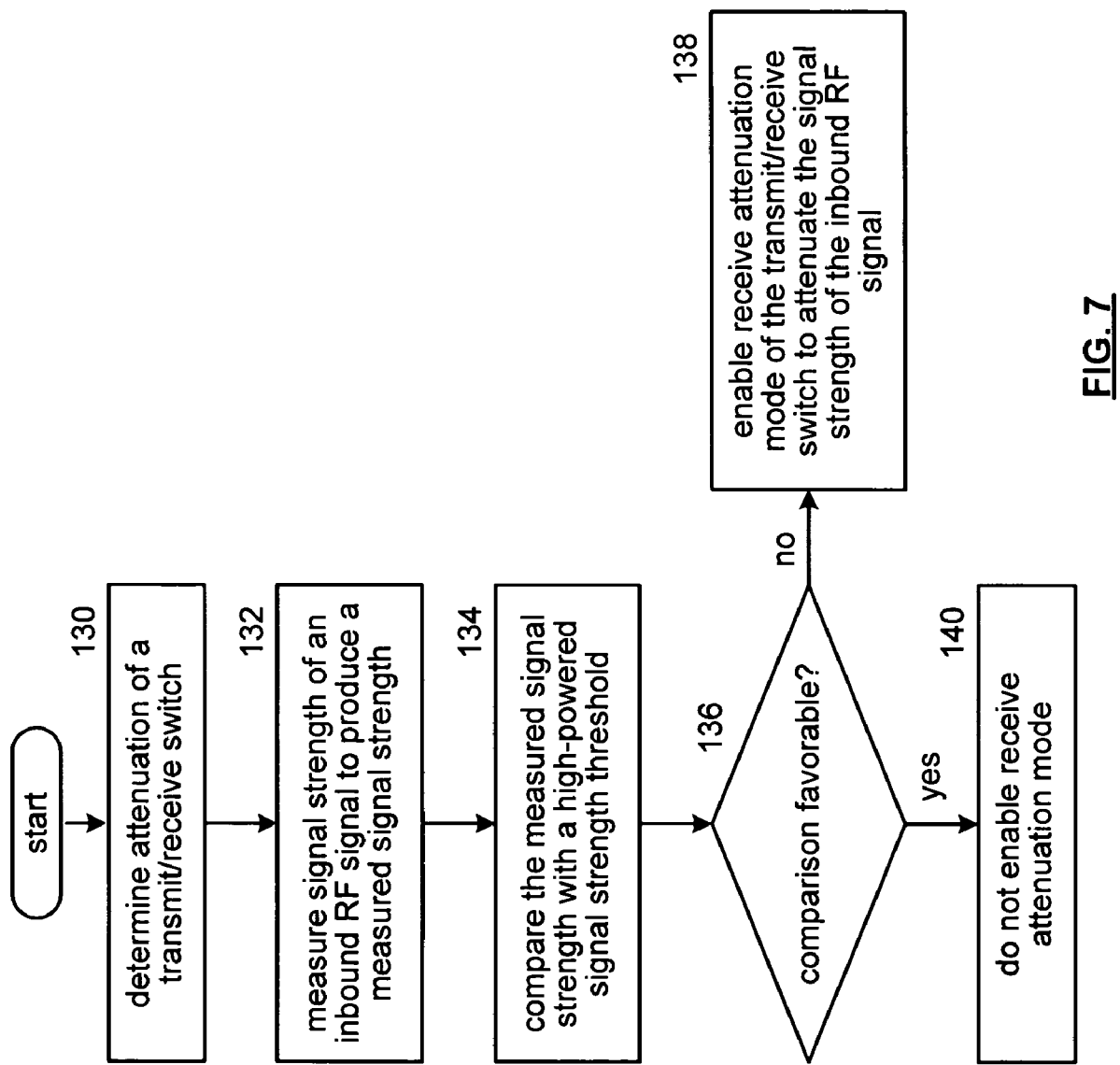

ATTENUATION OF HIGH-POWER INBOUND RF SIGNALS BASED ON ATTENUATION OF A T/R SWITCH

CROSS REFERENCE TO RELATED PATENTS

This patent application is claiming priority under 35 USC § 120 to co-pending patent application entitled ATTENUATION OF A RECEIVED RADIO FREQUENCY SIGNAL, having a Ser. No. 10/255,391, and a filing date of Sep. 26, 2002.

BACKGROUND OF THE INVENTION

1. Technical Field of the Invention

This invention relates generally to wireless communication systems and more particularly to radio frequency integrated circuits and radio frequency printed circuit boards used in such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is further known, the signal strength of a signal received by a radio receiver decreases approximately exponentially as the distance between the receiver and the transmitter that transmitted the signal increases linearly. As such, most wireless communication standards prescribe a minimum receive signal strength indication (RSSI) and/or signal-to-noise ratio (SNR) at which the receiver must operate, which, along with the prescribed transmit power, effectively establishes the maximum distance between a radio receiver and a radio transmitter. For example, many wireless LAN specifications (e.g., IEEE 802.11a, b, Bluetooth, et cetera) provide a minimum RSSI of −80 dBm with upper power levels of approximately −45 dBm.

As the uses for wireless LANs increase, differing power range requirements are emerging. For instance, wireless LAN applications for computers are requiring a power range of −80 dBm to +4 dBm. Thus, a receiver must be able to accurately process signals over this vast power range. However, since prior applications have a smaller power range that have high power levels of −20 dBm to −45 dBm, most receivers only included gain stages to amplify incoming signals. Thus, even with setting the gain stages at their respective minimum gains, large amplitude signals (e.g., greater than −10 dBm) would saturate the receiver. Once the receiver saturates, it cannot accurately recapture data from the received signals.

Therefore, a need exists for a method and apparatus for attenuating received RF signals in radio frequency integrated circuits (RFIC) and/or radio frequency printed circuit boards.

BRIEF SUMMARY OF THE INVENTION

The attenuation of high powered inbound RF signals based on attenuation of a transmit/receive switch in accordance with the present invention substantially meets these needs and others. In one embodiment, a method for determining attenuation of a transmit/receive switch for attenuating inbound RF signals begins by enabling the transmit/receive switch to provide a loop back configuration between a transmitter section and a receiver section of a radio frequency integrated circuit. When the transmit section provides a test RF signal to the receiver section the processing continues when the receiver section measures the signal strength of the test RF signal to produce a $1^{st}$ signal strength. The processing continues by enabling receive attenuation mode of the transmit/receive switch. For example, the receive attenuation mode may include enabling the transmit portion of the T/R switch while disabling the receive portion. The processing continues when the transmit section provides another test RF signal to the receiver section via the transmit/receive switch in the receive attenuation mode to produce an attenuated test RF signal. The processing continues when the receive section measures the signal strength of the attenuated test RF signal to produce a $2^{nd}$ signal strength. The processing continues when the $1^{st}$ signal strength is compared with the $2^{nd}$ signal strength to determine the attenuation of the transmit/receive switch.

In another embodiment, a method for attenuating high powered inbound RF signals begins by determining attenuation of the transmit/receive switch. The processing then continues by measuring signal strength of an inbound RF signal to produce a measured signal strength. The processing then continues by comparing the measured signal strength with a high powered signal strength threshold, where the high powered signal strength threshold is based on the attenuation of the transmit/receive switch in a maximum input power level. Accordingly, it is desired to place the transmit/receive switch in the attenuation mode when the power level of the incoming signal would potentially saturate the receiver. The processing continues by enabling the receive attenuation mode of the transmit/receive switch to attenuate the signal strength of the inbound RF signal when the comparing of the measured signal strength with the high powered signal strength threshold was unfavorable. With such a method, inbound RF signals may be accurately attenuated to avoid saturating the receiver section of a radio frequency integrated circuit.

BRIEF DESCRIPTION OF THE SEVERAL VIEWS OF THE DRAWINGS

FIG. 7 is a logic diagram of a method for attenuating high powered inbound radio frequency signals in accordance with the present invention.

DETAILED DESCRIPTION OF THE INVENTION

Figure 1:
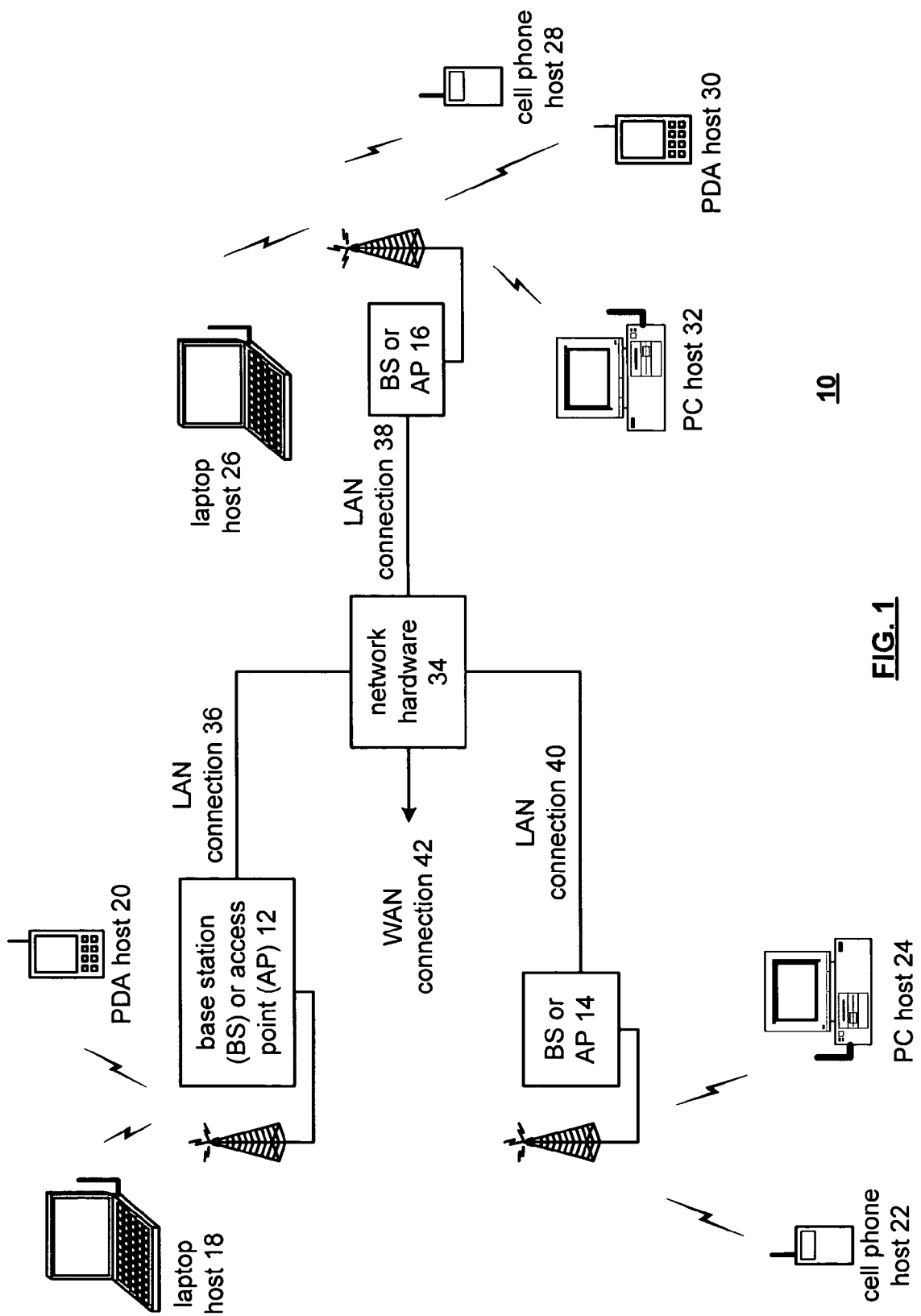
FIG. 1 is a schematic block diagram of a wireless communication system in accordance with the present invention.

FIG. 1 is a schematic block diagram illustrating a communication system 10 that includes a plurality of base stations and/or access points 12–16, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12–16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12–16 has an associated antenna or antenna array to communicate with the wireless communication devices in its area. Typically, the wireless communication devices register with a particular base station or access point 12–14 to receive services from the communication system 10. For direc connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
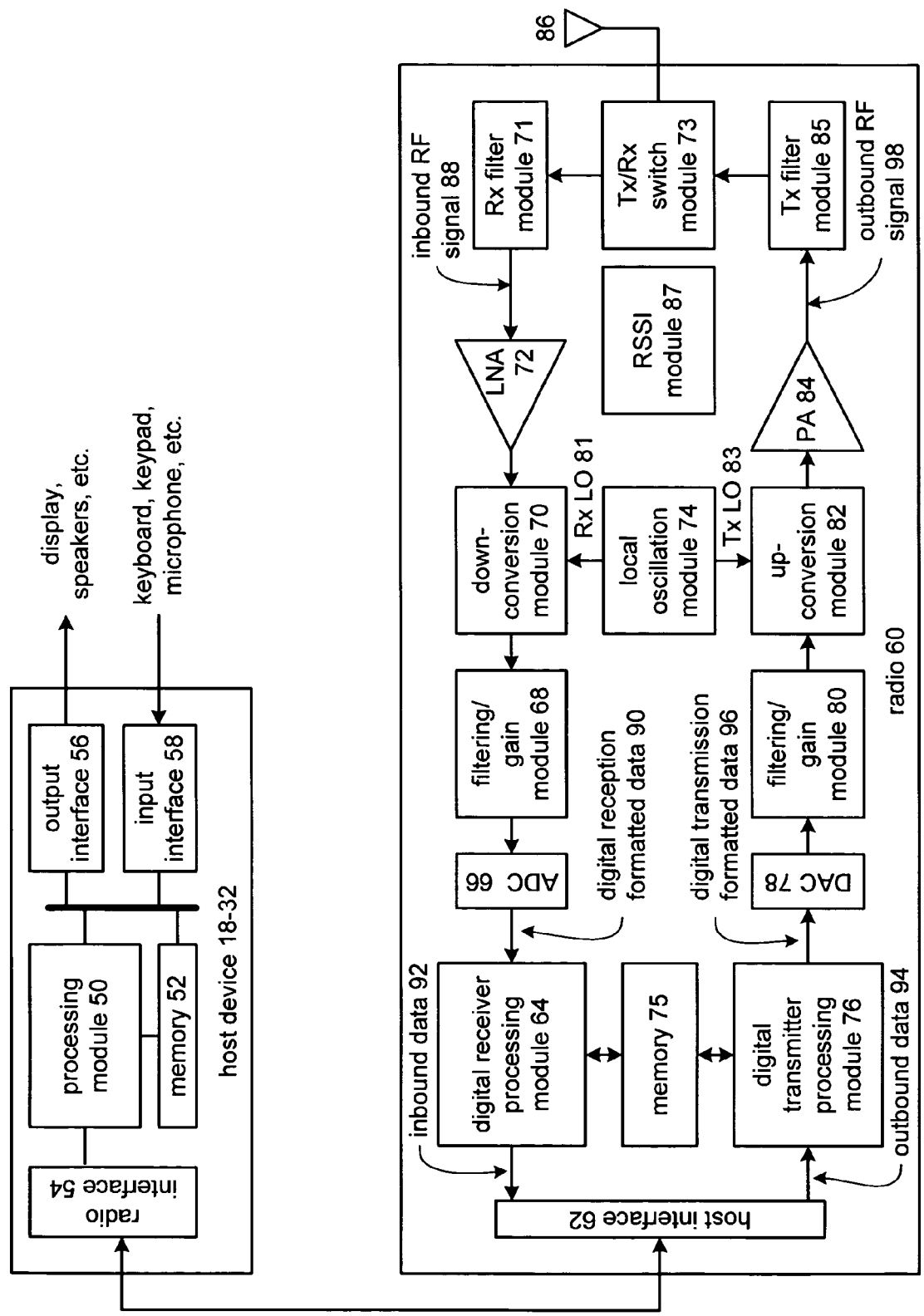
FIG. 2 is a schematic block diagram of a wireless communication device in accordance with the present invention.

FIG. 2 is a schematic block diagram illustrating a wireless communication device that includes the host device 18–32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18–32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/attenuation module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, a received signal strength indication (RSSI) module 87, and an antenna 86. The antenna 86 may be a single antenna that is shared by the transmit and receive paths as regulated by the Tx/Rx switch 73, which may be on-chip or off-chip, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 directly converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal. The RSSI module 87 measures the RSSI 91 of the received signal 89, which may be the output of the LNA 72, the output of the down-conversion module 70, the digital reception formatted data 90, the inbound data 92, or intermediaries thereof.

The analog-to-digital converter 66 converts the filtered inbound signal from the analog domain to the digital domain to produce digital reception formatted data 90. The digital receiver processing module 64 decodes, descrambles, demaps, equalizes channel response, and/or demodulates the digital reception formatted data 90 to recapture inbound data 92 in accordance with the particular wireless communication standard being implemented by radio 60. The host interface 62 provides the recaptured inbound data 92 to the host device 18–32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
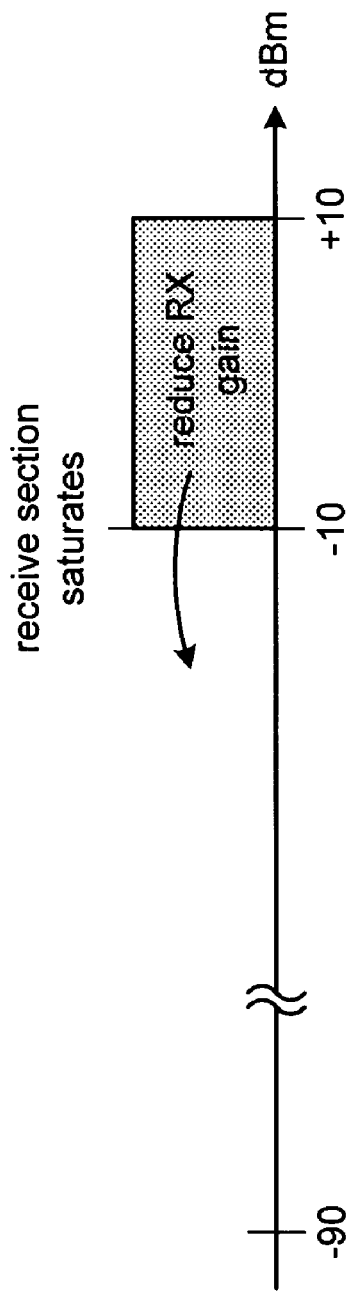
FIG. 3 is a graphical representation of input power range of inbound RF signals in accordance with the present invention.

FIG. 3 is a graphical representation of the signal strength range for inbound radio frequency signals. As shown, the signal strength may range from −90 dBm to +10 dBm. As is further shown, the low noise amplifier of the receiver may saturate in the neighborhood of −10 dBm. As such, when the signal strength of the inbound RF signals is above −10 dBm, the gain of the receiver needs to be reduced such that the low noise amplifier, or any other component of the receiver, does not saturate.

Figure 4:
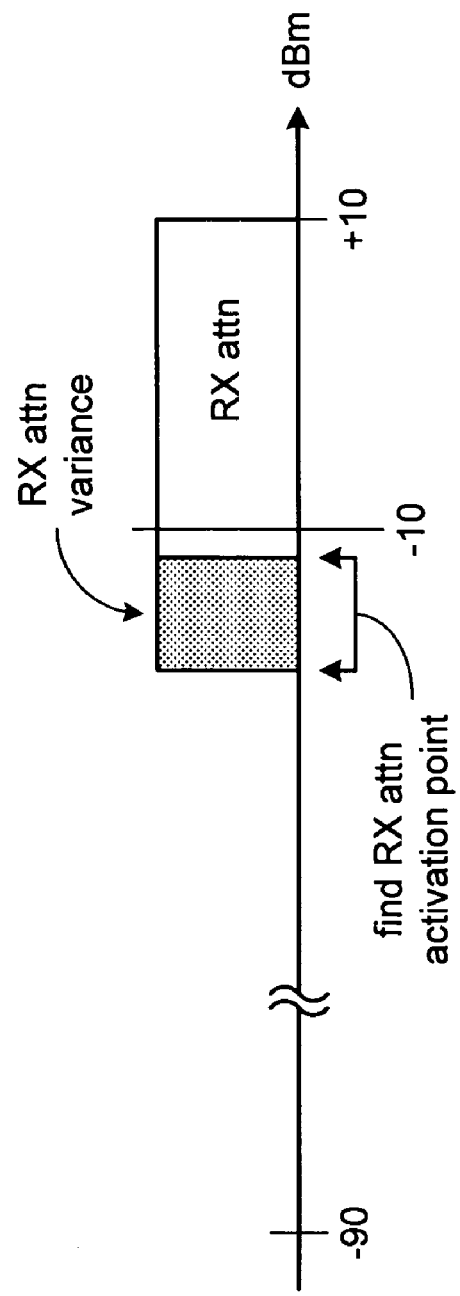
FIG. 4 is a graphical representation of an activation point for enabling the receiver attenuation in accordance with the present invention.

FIG. 4 is a graphical representation of the receiver attenuation activation point (i.e., the RSSI level where the attenuation of the receiver is initiated). In one embodiment, the receiver attenuation may be effectuated by placing the transmit/receive switch in the transmit mode while receiving inbound RF signals. In this configuration, the transmit/receive switch provides an attenuation of 20 dBm plus or minus 20%. To effectively enable the receiver attenuation via the transmit/receive switch, it is desirable to know the actual attenuation of the transmit/receive switch in the receiver attenuation mode (i.e., enabling the transmit portion and disabling the receive portion of the T/R switch). Accordingly, the illustration of FIG. 4 provides an example of determining the actual receiver attenuation activation point in accordance to the attenuation variance from integrated circuit to integrated circuit of the transmit/receive switch and/or from external transmit/receive switch to external-transmit/receive switch.

Figure 5:
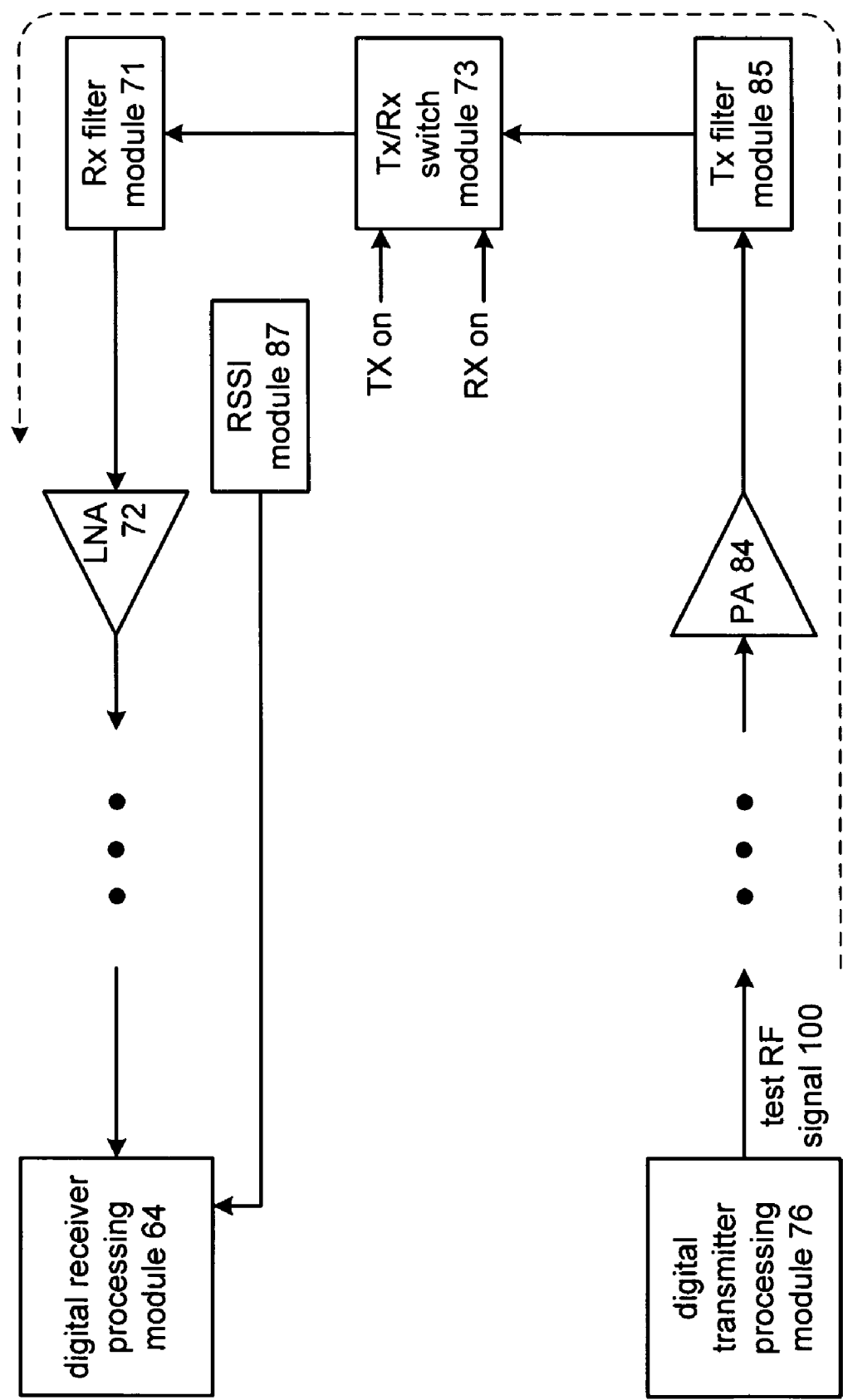
FIG. 5 is a schematic block diagram of the RF portion of the wireless communication device in accordance with the present invention.

FIG. 5 is a schematic block diagram of the radio portion of the wireless communication device of FIG. 2. In this illustration, the RF section includes the low noise amplifier 72, receiver filter module 71, the T/R switch module 73, the transmit filter module 84, the T/R filter module 85, and the power amplifier 84. In a test mode for determining the attenuation of the T/R switch, the digital transmitter processing module 76 generates a baseband test signal 100 that is provided to the transmit radio portion of the wireless communication device. Subsequently, the power amplifier 84 provides the test RF signal 100 to the transmit/receive switch module 73 wherein the transmit/receive switch module 73 is in the receive mode. To replace the transmit/receive switch module 73 in the receive mode, the Rx on signal is enabled while the Tx on signal is disabled.

The transmit/receive switch module 73 provides the test RF signal 100 to the low noise amplifier 72 via the Rx filter module 71. The RSSI module 87 measures the signal strength of the test RF signal 100, anywhere along the receiver path, with the T/R switch module 73 in the receive mode. The signal strength value is recorded by the digital receiver processing module 64.

Next, the T/R switch module 73 is placed in the transmit mode (i.e., effectively placing the T/R switch module 73 in the receiver attenuation mode), the digital transmitter processing module 76 again produces the test signal 100. To put the T/R switch in the receiver attenuation mode, the TX on input of the Tx/Rx switch module 73 is enabled and the RX on input of the Tx/Rx switch module 73 is disabled or both inputs are disabled. The power amplifier 84 amplifies the test RF signal 100 and provides it to the receiver section via the T/R switch module 73.

The RSSI module 87 measures the signal strength of the test RF signal 100, anywhere along the receiver path, with the T/R switch module 73 in the receiver attenuation mode to produce a $2^{nd}$ signal strength. The digital receiver processing module 64 compares the $1^{st}$ signal strength value when the T/R switch module is in the receive mode (i.e., without receiver attenuation) to the $2^{nd}$ signal strength when the T/R switch module 73 is in the transmit mode (i.e., with receiver attenuation). Based on these values, the digital receiver processing module 64 can readily determine the attenuation provided by the T/R switch module 73 when in the receiver attenuation mode. Based on this value, the receiver signal processing module 64, as inbound RF signals are being received, can trigger the T/R switch attenuation mode such that the receiver section is not saturated.

Figure 6:
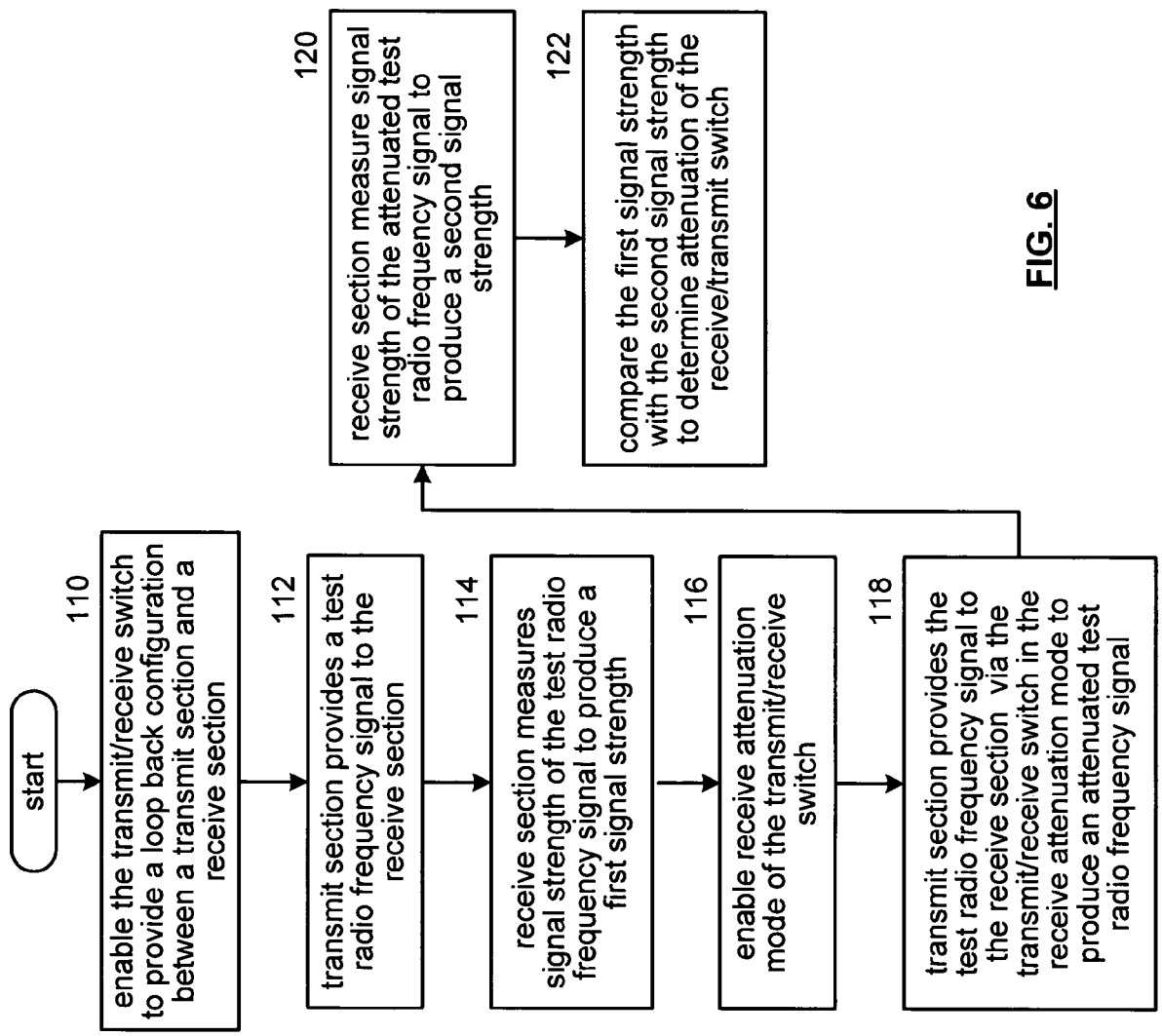
FIG. 6 is a logic diagram of a method for determining attenuation of a transmit/receive switch in accordance with the present invention.

FIG. 6 is a logic diagram of a method for determining attenuation of a transmit/receive switch for attenuating inbound RF signals. The process begins at Step 110 where the transmit/receive switch is enabled to provide a loop back configuration between the transmitter section and receiver section of the radio. This may be done by enabling both the transmit switch and receive switch of the transmit/receive switch. The process then proceeds to Step 112 where the transmit section provides a test radio frequency signal to the receive section.

The process then proceeds to Step 114 where the receive section measures the signal strength of the test radio frequency signal to produce a $1^{st}$ signal strength. This may be done by measuring the magnitude of the test radio frequency signal, squaring the magnitude, determining a power level based on the squared magnitude and then equating the power level to a received signal strength indication. As one of average skill in the art will appreciate, the signal strength of the test signal may be done on the in-phase signal components of the RF signal as well as the quadrature components of the RF signal.

The process then proceeds to Step 116 where the receive attenuation mode of the transmit switch is enabled. This may be done by enabling the transmit switch of the transmit/receive switch and disabling the receive switch of the transmit/receive switch, where in parasitic components of the receive switch provide attenuation of the test radio frequency signal to the receive section.

The process then proceeds to Step 118 where the transmit section provides the test radio frequency signal to the receive section via the transmit/receive switch in the receive attenuation mode to produce an attenuated test radio frequency signal. The process then proceeds to Step 120 where the receive section measures signal strength of the attenuated test radio frequency signal to produce a $2^{nd}$ signal strength. The process then proceeds to Step 122 where the $1^{st}$ signal strength is compared with the $2^{nd}$ signal strength to determine the attenuation of the receive/transmit switch. As one of average skilled in the art will appreciate, the processing of FIG. 6 may be done at set up, periodically during operation of the radio, and/or upon environmental changes.

FIG. 7 is a logic diagram of a method for attenuating high powered inbound radio frequency signals. The process begins at Step 130 where attenuation of the transmit/receive switch is determined. This may be done as previously described with reference to FIG. 6. The process then proceeds to Step 132 where the signal strength of an inbound RF signal is measured to produce a measured signal strength. The process then proceeds to Step 134 where the measured signal strength is compared with a high powered signal strength threshold. The high powered signal strength threshold is based on the attenuation of the transmit/receive switch and a maximum input power level. For example, if the maximum input power level is +dBm and the attenuation of the transmit/receive switch is −25 dBm, the high powered signal strength threshold would be −15 dBm.

The process then proceeds to Step 136 where a determination is made as to whether the comparison was favorable. If so, the process proceeds to Step 140 where the transmit/receive switch stays in the receive mode, i.e., does not enable the receive attenuation mode. If, however, the comparison at Step 136 was unfavorable, the process proceeds to Step 138. At Step 138 the receive attenuation mode of the transmit/receive switch is enabled to attenuate the signal strength of the inbound RF signals based on the attenuation of the transmit/receive switch. In addition, at step 138, an automatic gain control module within the filter/gain module 68 may adjust its gain by a value corresponding to the attenuation of the T/R switch in the receive attenuation mode.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for determining attenuation of a transmit/receive switch and subsequently using the attenuation to attenuate high powered inbound RF signals. As one of average skill in the art will appreciate, other embodiments may be derived from the teaching of the present invention without deviating from the scope of the claims.

What is claimed is:

1. A method for determining attenuation of a transmit/receive switch for attenuating inbound radio frequency signals, the method comprises:
   enabling the transmit/receive switch to provide a loop back configuration between a transmit section and a receive section;
   providing, by the transmit section, a test radio frequency signal to the receive section;
   measuring, by the receive section, signal strength of the test radio frequency signal to produce a first signal strength;
   enabling receive attenuation mode of the transmit/receive switch;
   providing, by the transmit section, the test radio frequency signal to the receive section via the transmit/receive switch in the receive attenuation mode to produce an attenuated test radio frequency signal;
   measuring, by the receive section, signal strength of the attenuated test radio frequency signal to produce a second signal strength; and
   comparing the first signal strength with the second signal strength to determine attenuation of the transmit/receive switch.

2. The method of claim 1, wherein the enabling the transmit/receive switch to provide the loop back configuration further comprises:
   enabling a transmit switch of the transmit/receive switch; and
   enabling a receive switch of the transmit/receive switch.

3. The method of claim 2, wherein the enabling the receive attenuation mode further comprises:
   enabling the transmit switch of the transmit/receive switch; and
   disabling the receive switch of the transmit/receive switch, wherein parasitic components of the receive switch provide attenuation of the test radio frequency signal; or
   disabling the transmit switch and the receive switch of the transmit/receive switch.

4. The method of claim 1, wherein the measuring the signal strength of the test radio frequency signal and the attenuated test radio frequency signal further comprises at least one of:
   determining magnitude of the test radio frequency signal and the attenuated test radio frequency signal to produce the first and second signal strengths, respectively;
   determining a square of the magnitude of the test radio frequency signal and the attenuated test radio frequency signal to produce the first and second signal strengths, respectively;
   determining a power level of the test radio frequency signal and the attenuated test radio frequency signal to produce the first and second signal strengths, respectively; and
   determining a received signal strength indication of the test radio frequency signal and the attenuated test radio frequency signal to produce the first and second signal strengths, respectively.

5. The method of claim 1, wherein the measuring the signal strength of the test radio frequency signal and the attenuated test radio frequency signal further comprises: determining in-phase component and quadrature component magnitudes of the test radio frequency signal and the attenuated test radio frequency signal to produce the first and second signal strengths, respectively.

6. A method for attenuating high-powered inbound radio frequency (RF) signals, the method comprises:
   determining attenuation of a transmit/receive switch;
   measuring signal strength of an inbound RF signal to produce a measured signal strength;
   comparing the measured signal strength with a high-powered signal strength threshold, wherein the high-powered signal strength threshold is based on the attenuation of the transmit/receive switch and a maximum input power level; and
   when the comparing the measured signal strength with the high-powered signal strength threshold is unfavorable, enabling receive attenuation mode of the transmit/receive switch to attenuate the signal strength of the inbound RF signal.

7. The method of claim 6, wherein the determining attenuation of the transmit/receive switch further comprises:
   enabling the transmit/receive switch to provide a loop back configuration between a transmit section and a receive section;
   providing, by the transmit section, a test radio frequency signal to the receive section;
   measuring, by the receive section, signal strength of the test radio frequency signal to produce a first signal strength;
   enabling receive attenuation mode of the transmit/receive switch;
   providing, by the transmit section, the test radio frequency signal to the receive section via the transmit/receive switch in the receive attenuation mode to produce an attenuated test radio frequency signal;
   measuring, by the receive section, signal strength of the attenuated test radio frequency signal to produce a second signal strength; and
   comparing the first signal strength with the second signal strength to determine attenuation of the receive/transmit switch.

8. The method of claim 7, wherein the enabling the transmit/receive switch to provide the loop back configuration further comprises:
   enabling a transmit switch of the transmit/receive switch; and
   enabling a receive switch of the transmit/receive switch.

9. The method of claim 8, wherein the enabling the receive attenuation mode further comprises:
   enabling the transmit switch of the transmit/receive switch; and
   disabling the receive switch of the transmit/receive switch, wherein parasitic components of the receive switch provide attenuation of the test radio frequency signal.

10. The method of claim 7, wherein the measuring the signal strength of the test radio frequency signal and the attenuated test radio frequency signal further comprises at least one of:
    determining magnitude of the test radio frequency signal and the attenuated test radio frequency signal to produce the first and second signal strengths, respectively;
    determining a square of the magnitude of the test radio frequency signal and the attenuated test radio frequency signal to produce the first and second signal strengths, respectively;
    determining a power level of the test radio frequency signal and the attenuated test radio frequency signal to produce the first and second signal strengths, respectively; and
    determining a received signal strength indication of the test radio frequency signal and the attenuated test radio frequency signal to produce the first and second signal strengths, respectively.

11. The method of claim 7, wherein the measuring the signal strength of the test radio frequency signal and the attenuated test radio frequency signal further comprises:
   determining in-phase component and quadrature component magnitudes of the test radio frequency signal and the attenuated test radio frequency signal to produce the first and second signal strengths, respectively.

12. The method of claim 6 further comprises:
   establishing the high-powered signal strength threshold as the maximum input power level less the attenuation of the transmit/switch.

13. A radio frequency integrated circuit (RFIC) comprises:
   transmit section operably coupled to convert outbound data into outbound radio frequency (RF) signals;
   receive section operably coupled to convert inbound RF signals into inbound data;
   transmit/receive switch operably coupled to the transmit section and the receive section; and
   an apparatus for determining attenuation of the transmit/receive switch for attenuating the inbound RF signals by:
      enabling the transmit/receive switch to provide a loop back configuration between the transmit section and the receive section;
      providing, by the transmit section, a test radio frequency signal to the receive section;
      measuring, by the receive section, signal strength of the test radio frequency signal to produce a first signal strength;
      enabling receive attenuation mode of the transmit/receive switch;
      providing, by the transmit section, the test radio frequency signal to the receive section via the transmit/receive switch in the receive attenuation mode to produce an attenuated test radio frequency signal;
      measuring, by the receive section, signal strength of the attenuated test radio frequency signal to produce a second signal strength; and
      comparing the first signal strength with the second signal strength to determine attenuation of the receive/transmit switch.

14. The RFIC of claim 13, wherein the apparatus further functions to enable the transmit/receive switch to provide the loop back configuration by:
   enabling a transmit switch of the transmit/receive switch; and
   enabling a receive switch of the transmit/receive switch.

15. The RFIC of claim 14, wherein the apparatus further functions to enable the receive attenuation mode by:
   enabling the transmit switch of the transmit/receive switch; and
   disabling the receive switch of the transmit/receive switch, wherein parasitic components of the receive switch provide attenuation of the test radio frequency signal.

16. The RFIC of claim 13, wherein the apparatus further functions to measure the signal strength of the test radio frequency signal and the attenuated test radio frequency signal by at least one of:
   determining magnitude of the test radio frequency signal and the attenuated test radio frequency signal to produce the first and second signal strengths, respectively;
   determining a square of the magnitude of the test radio frequency signal and the attenuated test radio frequency signal to produce the first and second signal strengths, respectively;
   determining a power level of the test radio frequency signal and the attenuated test radio frequency signal to produce the first and second signal strengths, respectively; and
   determining a received signal strength indication of the test radio frequency signal and the attenuated test radio frequency signal to produce the first and second signal strengths, respectively.

17. The RFIC of claim 13, wherein the apparatus further functions to measure the signal strength of the test radio frequency signal and the attenuated test radio frequency signal by:
   determining in-phase component and quadrature component magnitudes of the test radio frequency signal and the attenuated test radio frequency signal to produce the first and second signal strengths, respectively.

18. A radio frequency integrated circuit (RFIC) comprises:
   transmit section operably coupled to convert outbound data into outbound radio frequency (RF) signals;
   receive section operably coupled to convert inbound RF signals into inbound data;
   transmit/receive switch operably coupled to the transmit section and the receive section; and
   an apparatus for attenuating high-powered inbound RF signals by:
      determining attenuation of the transmit/receive switch;
      measuring signal strength of the inbound RF signals to produce a measured signal strength;
      comparing the measured signal strength with a high-powered signal strength threshold, wherein the high-powered signal strength threshold is based on the attenuation of the transmit/switch and a maximum input power level; and
      when the comparing the measured signal strength with the high-powered signal strength threshold is unfavorable, enabling receive attenuation mode of the transmit/receive switch to attenuate the signal strength of the inbound RF signal.

19. The RFIC of claim 18, wherein the apparatus further functions to determine the attenuation of the transmit/receive switch by:
   enabling the transmit/receive switch to provide a loop back configuration between a transmit section and a receive section;
   providing, by the transmit section, a test radio frequency signal to the receive section;
   measuring, by the receive section, signal strength of the test radio frequency signal to produce a first signal strength;
   enabling receive attenuation mode of the transmit/receive switch;
   providing, by the transmit section, the test radio frequency signal to the receive section via the transmit/receive switch in the receive attenuation mode to produce an attenuated test radio frequency signal;
   measuring, by the receive section, signal strength of the attenuated test radio frequency signal to produce a second signal strength; and
   comparing the first signal strength with the second signal strength to determine attenuation of the receive/transmit switch.

20. The RFIC of claim 19, wherein the apparatus further functions to enable the transmit/receive switch to provide the loop back configuration by:
   enabling a transmit switch of the transmit/receive switch; and
   enabling a receive switch of the transmit/receive switch.

21. The RFIC of claim 20, wherein the apparatus further functions to enable the receive attenuation mode by:

enabling the transmit switch of the transmit/receive switch; and disabling the receive switch of the transmit/receive switch, wherein parasitic components of the receive switch provide attenuation of the test radio frequency signal.

22. The RFIC of claim 18, wherein the apparatus further functions to measure the signal strength of the test radio frequency signal and the attenuated test radio frequency signal by at least one of:

determining magnitude of the test radio frequency signal and the attenuated test radio frequency signal to produce the first and second signal strengths, respectively;

determining a square of the magnitude of the test radio frequency signal and the attenuated test radio frequency signal to produce the first and second signal strengths, respectively;

determining a power level of the test radio frequency signal and the attenuated test radio frequency signal to produce the first and second signal strengths, respectively; and determining a received signal strength indication of the test radio frequency signal and the attenuated test radio frequency signal to produce the first and second signal strengths, respectively.

23. The RFIC of claim 18, wherein the apparatus further functions to measure the signal strength of the test radio frequency signal and the attenuated test radio frequency signal by:

determining in-phase component and quadrature component magnitudes of the test radio frequency signal and the attenuated test radio frequency signal to produce the first and second signal strengths, respectively.

24. The RFIC of claim 18, wherein the apparatus further functions to:

establish the high-powered signal strength threshold as the maximum input power level less the attenuation of the transmit/switch.

\* \* \* \* \*

UNITED STATES PATENT AND TRADEMARK OFFICE
CERTIFICATE OF CORRECTION

PATENT NO. : 7,415,246 B2
APPLICATION NO. : 10/701575
DATED : August 19, 2008
INVENTOR(S) : Hea Joung Kim et al.

Page 1 of 1

It is certified that error appears in the above-identified patent and that said Letters Patent is hereby corrected as shown below:

Title page, after item "(65) Prior Publication Data US 2005/0095993 A1 May 5, 2005" insert
--Related U.S. Application Data
(63) Continuation-in-part of application No. 10/255,391, filed on Sep. 26, 2002.--

Column 1, lines 7 through 11 should read:
This patent application is claiming priority under 35 USC § 120 as a continuation-in-part patent application to co-pending patent application entitled ATTENUATION OF A RECEIVED RADIO FREQUENCY SIGNAL, having a serial number of 10/255,391, and a filing date of Sep. 26, 2002.

Signed and Sealed this

Fifth Day of January, 2010

David J. Kappos
*Director of the United States Patent and Trademark Office*